(12) United States Patent
Shinohara (10) Patent No.: US 7,990,482 B2
(45) Date of Patent: Aug. 2, 2011

(54) ELECTRO-OPTICAL DEVICE, METHOD OF MANUFACTURING ELECTRO-OPTICAL DEVICE, AND ELECTRONIC APPARATUS

(75) Inventor: Takashi Shinohara, Suwa (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 12/351,410

(22) Filed: Jan. 9, 2009

(65) Prior Publication Data

US 2009/0185088 A1    Jul. 23, 2009

(30) Foreign Application Priority Data

Jan. 21, 2008 (JP) .................. 2008-010098

(51) Int. Cl.
*G02F 1/1333* (2006.01)
*G06F 3/041* (2006.01)
(52) U.S. Cl. .............. 349/12; 349/15; 349/141
(58) Field of Classification Search .......... 349/12, 349/15, 141, 187; 345/173, 174; 359/462, 359/466, 467; 348/51; 178/18.06, 18.09, 178/18.11

See application file for complete search history.

(56) References Cited

U.S. PATENT DOCUMENTS

2007/0006081 A1 * 1/2007 Maehata et al. ............. 715/727
2010/0321621 A1 * 12/2010 Kikuchi et al. ............. 349/122

FOREIGN PATENT DOCUMENTS

JP        06-309100        11/1994
JP        2005-071286       3/2005
WO    WO 2009/069358    *  6/2009

* cited by examiner

*Primary Examiner* — David Nelms
*Assistant Examiner* — Tai Duong
(74) *Attorney, Agent, or Firm* — K&L Gates LLP (57) ABSTRACT

An electro-optical device that displays a multiple viewing point image includes an electro-optical panel that has a plurality of pixels and includes at least a first substrate having transparency, a touch panel that detects contact in accordance with a change in electrostatic capacitance and includes a second substrate having transparency, a barrier layer that is formed on a face of the second substrate which is located on the first substrate side, has an opening part disposed in correspondence with an area between the adjacent pixels, and has a light shielding property, and a detection electrode that is formed on a face of the second substrate which is located on a side apart from the first substrate, has transparency, is used for detecting contact depending on a change in electrostatic capacitance. The second substrate and the first substrate are fixed with the barrier layer interposed therebetween.

7 Claims, 10 Drawing Sheets

FIG. 8

ELECTRO-OPTICAL DEVICE, METHOD OF MANUFACTURING ELECTRO-OPTICAL DEVICE, AND ELECTRONIC APPARATUS

BACKGROUND

1. Technical Field

The present invention relates to an electro-optical device, a method of manufacturing an electro-optical device, and an electronic apparatus.

2. Related Art

Liquid crystal display panels are display devices that have a liquid crystal layer that is interposed between two substrates and has anisotropic permittivity and displays a desired still image or a desired motion picture by adjusting the intensity of an electric field applied to the liquid crystal layer so as to adjust the amount of light passing through the substrate. The liquid crystal display panel has superior advantages in a decrease in weight, a decrease in thickness, a decrease in power consumption, and the like. Thus, the liquid crystal display panel is not limited to be employed to a familiar device such as a cellular phone, a vehicle navigation system, a PDA, a personal computer, or a television receiver and is employed as a display device of a measurement instrument, a medical instrument, an industrial instrument, or the like.

Among the devices using the above-described liquid crystal display panel, there are devices that can manipulate a still image or a motion picture displayed on the liquid display panel not only by the operation of a remote controller but also by the operation of a touch panel. The touch panel is superposed in a front face of the liquid crystal display panel and can perform a touch operation control process by touching on a touch operation screen on which, for example, a bar, a key switch, and the like are displayed in accordance with a direction for selecting an operation displayed on the liquid crystal display panel. In other words, in such a case, the contents of the touch operation screen become switches so as to allow an intuitive operation, and thus, not only the visual recognition and operationability can be improved but also various functions can be controlled in an easy manner. As types of the touch panels, an electromagnetic induction type, an electric resistance type, an electrostatic capacitance type, a pressure sensitive type, and the like have been known.

By employing dual-view display technology, the liquid crystal display panel can simultaneously display an image of a channel and an image from a different source. In addition, the dual-view display technology is not limited to two-dimensional (2D) display in which different images are viewed only in an area defined in a space, and dual-view display technology that is used for three-dimensional (3D) display that can display a three-dimensional image by enabling a viewer to view different images in both eyes has been known. For example, technology in which 2D or 3D display that is displayed on the liquid crystal display panel can be manipulated by an operation of a touch panel by combining the dual-view display technology and the touch panel mode has been proposed (see JP-A-2005-71286).

However, in the above-described technology, an element such as a light shielding barrier, a lenticular lens, or the like that divides images is attached to a general display device and a touch panel is attached thereon. Accordingly, there is a problem that the thickness of the device increases. In addition, there is a problem that a bonding process becomes complicated.

SUMMARY

An advantage of some aspects of the invention is that it provides an electro-optical device, a method of manufacturing an electro-optical device, and an electronic apparatus. The invention can be implemented in the following forms or application examples.

Application Example 1

According to Application Example 1, there is provided an electro-optical device that displays a multiple viewing point image including: an electro-optical panel that has a plurality of pixels and includes at least a first substrate having transparency; a touch panel that detects contact in accordance with a change in electrostatic capacitance and includes a second substrate having transparency; a barrier layer that is formed on a face of the second substrate which is located on the first substrate side, has an opening part disposed in correspondence with an area between the adjacent pixels, and has a light shielding property; and a detection electrode that is formed on a face of the second substrate which is located on a side apart from the first substrate, has transparency, is used for detecting contact depending on a change in electrostatic capacitance. The second substrate and the first substrate are fixed with the barrier layer interposed therebetween.

According to the above-described electro-optical device, the barrier layer is formed in the second substrate and the second and first substrates are fixed with the barrier layer interposed therebetween, and thereby the thickness of the electro-optical device is small. Accordingly, one substrate is omitted, and the thickness of the electro-optical device decreases by the thickness thereof. As a result, the electro-optical device that can be miniaturized and lightened and can reduce costs can be provided.

Application Example 2

According to Application Example 2, there is provided the above-described electro-optical device, wherein the barrier layer is a metal film.

According to the above-described electro-optical device, the barrier layer has a function of a conductive film, and thereby a general conductive film is not needed. Accordingly, one substrate is omitted, and the thickness of the electro-optical device decreases by the thickness thereof. As a result, the electro-optical device can be miniaturized and lightened further and can reduce costs.

Application Example 3

According to Application Example 3, there is provided the above-described electro-optical device, wherein the electro-optical panel includes a light shielding film having a light shielding property disposed between the adjacent pixels, and the width of the opening part of the barrier layer is larger than that of the light shielding film.

According to the above-described electro-optical device, the amount of light output from the opening part increases, and thereby the luminance of the entire election-optical panel is improved.

Application Example 4

According to Application Example 4, there is provided the above-described electro-optical device, wherein the electro-optical panel includes a light shielding film having a light shielding property disposed between the adjacent pixels, and the width of the opening part of the barrier layer is equal to or smaller than that of the light shielding film.

According to the above-described electro-optical device, generation of crosstalk between the pixels can decrease further, and thereby the display quality is improved.

Application Example 5

According to Application Example 5, there is provided the above-described electro-optical device, wherein the electro-optical panel includes: a third substrate that is formed to face the first substrate with a gap interposed therebetween and has transparency; an electro-optical material that is formed between the first substrate and the third substrate; and a common electrode and a pixel electrode that apply a driving voltage to the electro-optical material formed on an electro-optical material side of the first substrate.

According to the above-described electro-optical device, the electro-optical panel can be configured in an easy manner.

Application Example 6

According to Application Example 6, there is provided a method of manufacturing an electro-optical device that displays a multiple viewing point image. The method includes: forming an electro-optical panel that has a plurality of pixels and includes at least a first substrate having transparency; forming a touch panel that detects contact in accordance with a change in electrostatic capacitance and includes a second substrate having transparency; forming a barrier layer that is formed on a face of the second substrate which is located on the first substrate side, has an opening part disposed in correspondence with an area between the adjacent pixels, and has a light shielding property; and forming a detection electrode that is formed on a face of the second substrate which is located on a side apart from the first substrate, has transparency, is used for detecting contact depending on a change in electrostatic capacitance. The second substrate and the first substrate are fixed with the barrier layer interposed therebetween.

According to the above-described method, the method of manufacturing the electro-optical device in which the second and first substrates can be bonded in an easy manner by simultaneously fixing the second and first substrate with the barrier layer interposed therebetween can be provided.

Application Example 7

According to Application Example 7, there is provided an electronic apparatus having the above-described electro optical device.

According to the above-described electronic apparatus, the above-described electro-optical device is mounted, and thereby the electro-optical device that can be miniaturized and lightened and can reduce costs is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an electro-optical device according to an embodiment of the present invention will be described with reference to the accompanying drawings. In the drawings used for descriptions below, in order to represent each member in a recognizable size, the scale thereof is appropriately changed.

Electro-Optical Device

An electro-optical device according to this embodiment is a liquid crystal display device that includes first pixels as a plurality of images for displaying a first image as a multiple viewing point image and second pixels as a plurality of images for displaying a second image as a multiple viewing point image and simultaneously displays the first image and the second image in different directions. The electro-optical device according to this embodiment is a transmission-type color liquid crystal display that configures one pixel by using three sub pixel areas outputting light of r (red), g (green), and b (blue) colors. Here, a display area that becomes a minimum unit for configuring display is referred to as a "sub pixel area".

First, a schematic configuration of the liquid crystal device according to this embodiment will be described.

Figure 1:
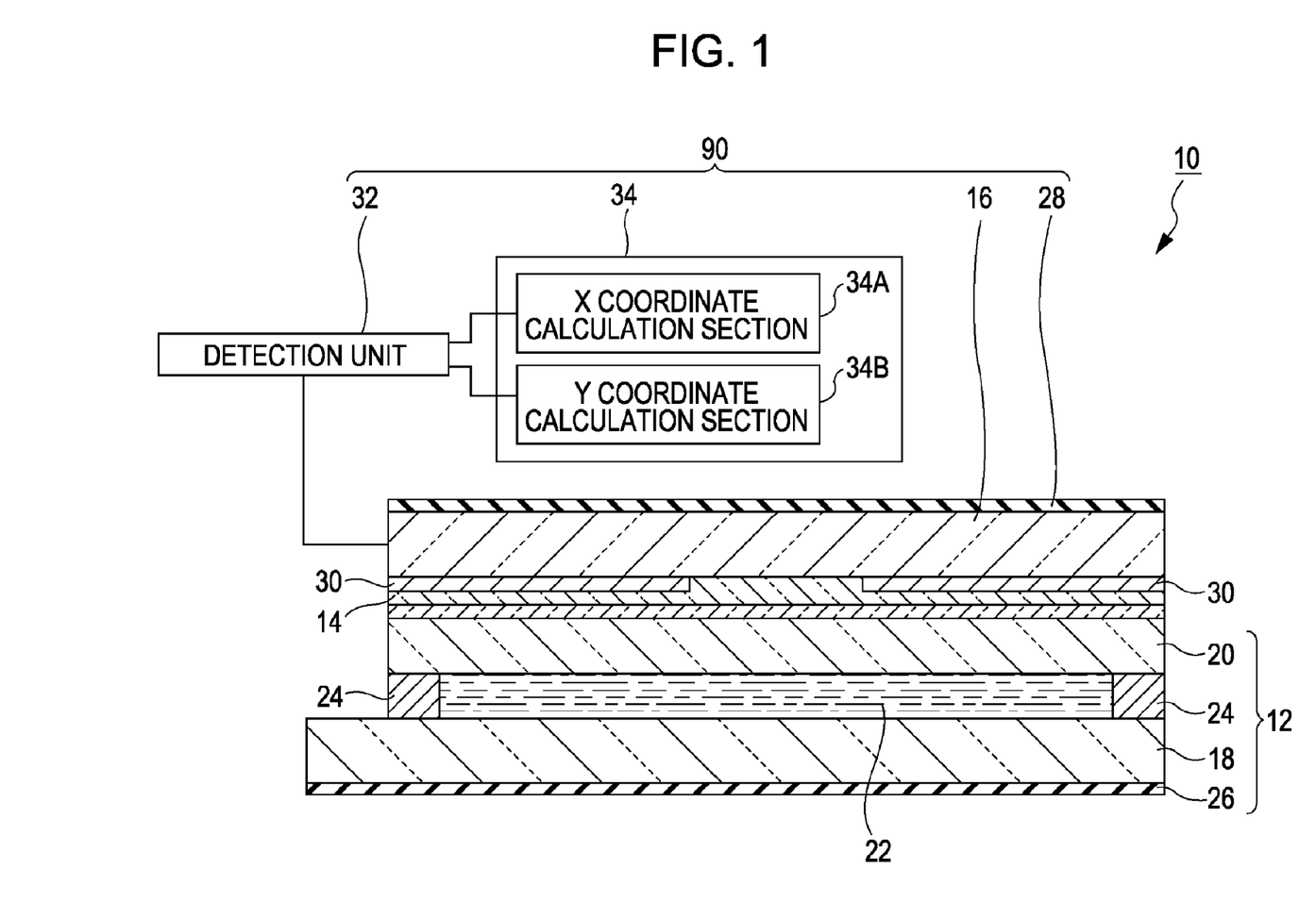
FIG. 1 is a diagram showing the schematic configuration of a liquid crystal display device according to an embodiment of the invention.

FIG. 1 is a diagram showing the schematic configuration of the liquid crystal display device 10 according to this embodiment. The liquid crystal display device 10 according to this embodiment, as shown in FIG. 1, includes a liquid crystal panel 12 as an electro-optical panel and a touch panel 16 that is attached to the liquid crystal panel 12 through an adhesive agent 14.

The liquid crystal panel 12 includes a component substrate 18 that is an active matrix substrate, an opposing substrate 20 that is disposed to face the component substrate 18 with a gap interposed therebetween, and a liquid crystal layer (electro-optical material) 22 that is pinched by the component substrate 18 and the opposing substrate 20. The liquid crystal panel 12 has a sealing member 24 that is disposed in an outer periphery part of an opposing area in which the component substrate 18 and the opposing substrate 20 face each other and is in the shape of an approximate rectangle frame in a plan view. By the sealing member 24, the component substrate 18 and the opposing substrate 20 are bonded to each other. In addition, on the inner side of the sealing member 24 of the liquid crystal panel 12, an image display area is formed. The liquid crystal panel 12 is configured to project illumination light from the outer face side (a side that is apart from the liquid crystal layer 22) of the component substrate 18. The liquid crystal 12 includes a polarizing plate 26 that is disposed on an outer side of the component substrate 18 and a polarizing plate 28 that is disposed on an outer side (a side that is apart from the liquid crystal layer 22) of the opposing substrate 20.

The touch panel 16 includes a barrier layer 30 (light shielding pattern) on the opposing substrate 20 side. In addition, the liquid crystal display device 10 includes a detection unit 32 that detects contact of a finger or the like into the touch panel 16 and a calculation unit 34 that calculates contact coordinates.

Figure 2:
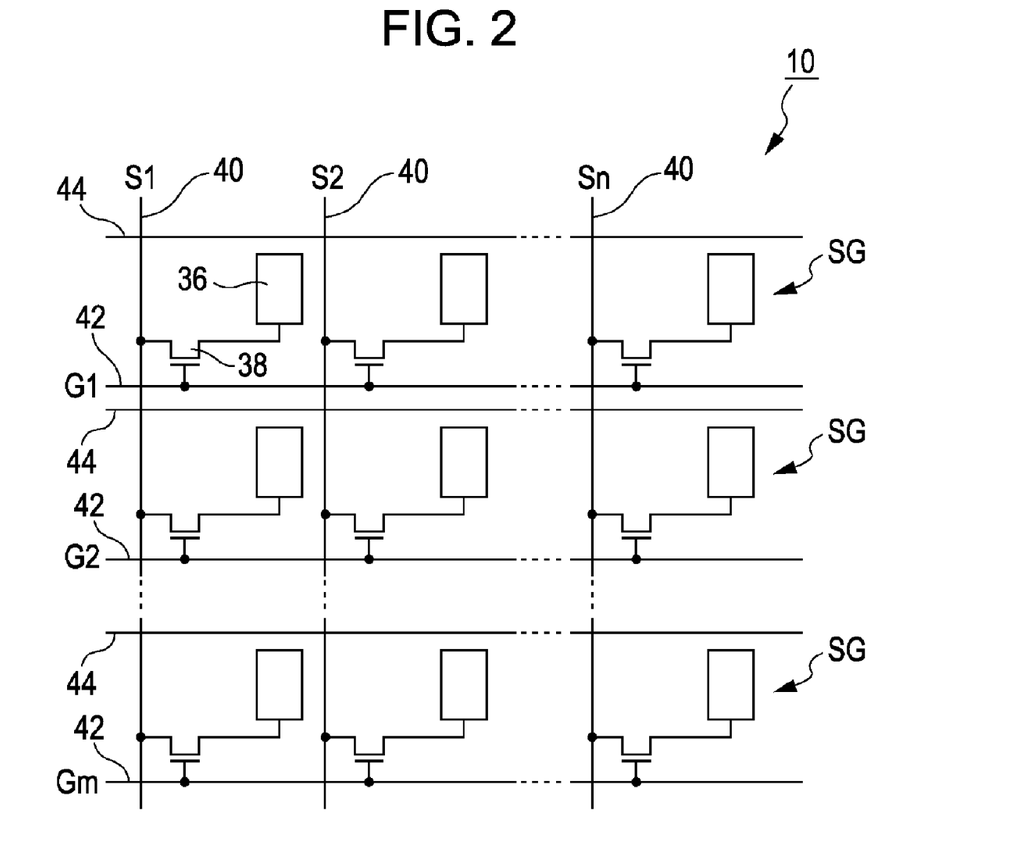
FIG. 2 is an equivalent circuit diagram of the liquid crystal device according to the embodiment.

FIG. 2 is an equivalent circuit diagram of the liquid crystal device 10 according to this embodiment. In the liquid crystal display device 10 according to this embodiment, as shown in FIG. 2, a plurality of sub pixel areas SG is disposed in a matrix shape. In each of the plurality of sub pixels SG, a pixel electrode 36 and a TFT (Thin Film Transistor) element 38 used for control of switching of the pixel electrode 36 are formed. In addition, in the image display area, a plurality of data lines 40 and a plurality of scanning lines 42 are disposed in a lattice shape.

In the TFT element 38, a source is connected to the data line 40, a gate is connected to the scanning line 42, and a drain is connected to the pixel electrode 36.

The data lines 40 are configured to supply image signals, S1, S2, . . . , Sn that are supplied from a driving circuit (not shown) disposed in the liquid crystal display device 10 to the sub pixel areas. Here, the data lines 40 may supply the image signals S1 to Sn in the described order in a line sequential manner, or may supply the image signals for each group of a plurality adjacent data lines 40.

The scanning lines 42 are configured to supply scanning signals G1, G2, . . . , Gm that are supplied from a driving circuit (not shown) disposed in the liquid crystal display device 10 to the sub pixel areas. Here, the scanning lines 42 are configured to supply the scanning signals G1 to Gm as pulses at a predetermined timing in a line sequential manner.

In addition, the liquid crystal display device 10 is configured such that the image signals S1 to Sn that are supplied from the data lines 40 are written into the pixel electrodes 36 at a predetermined timing by turning on the TFT elements 38 as switching elements in accordance with input of the scanning signals G1 to Gm only for a predetermined period. In addition, the image signals S1 to Sn of predetermined levels that are written into the liquid crystal through the pixel electrodes 36 are maintained for a predetermined period between the pixel electrodes 36 and common electrodes 44 to be described later.

Figure 3:
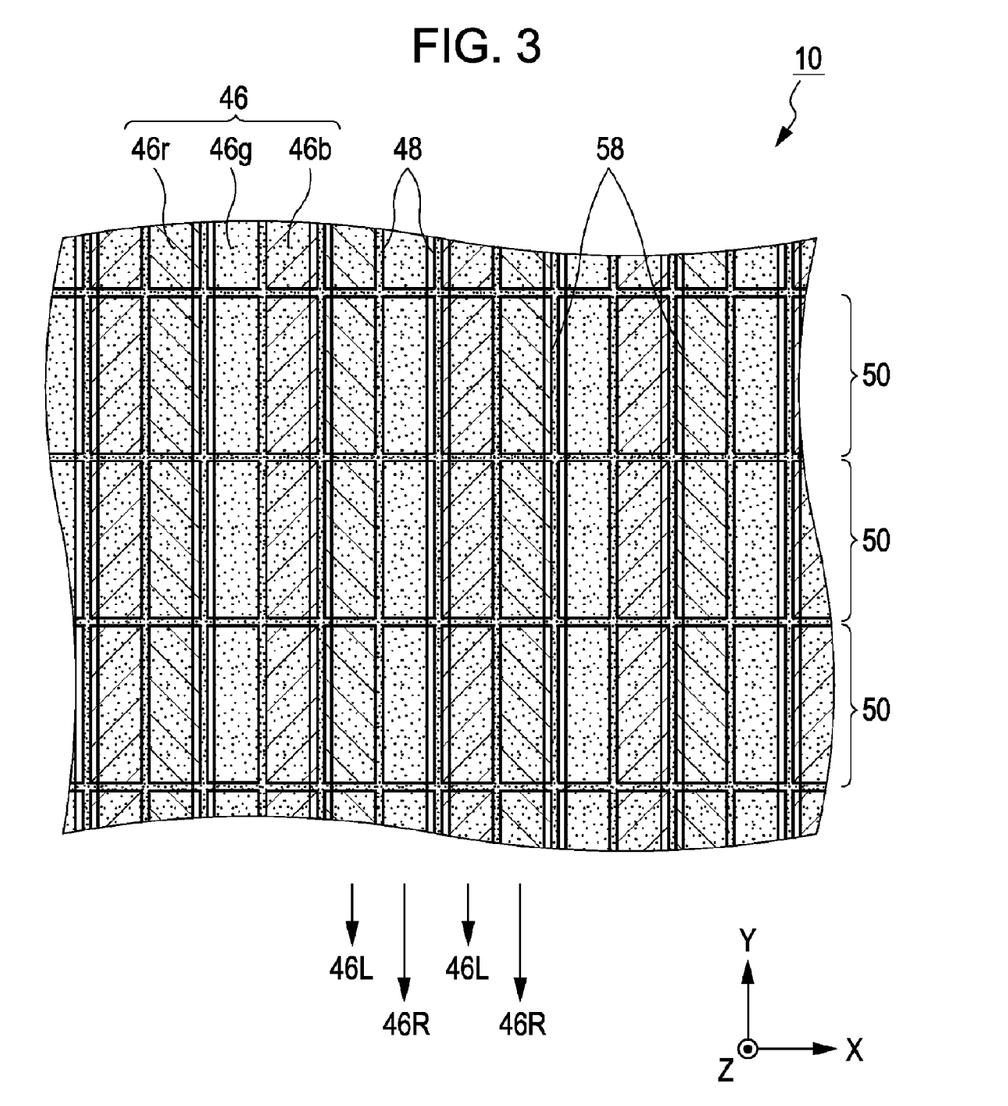
FIG. 3 is an enlarged plan view of the liquid crystal display device according to the embodiment.

FIG. 3 is an enlarged plan view of the liquid crystal display device 10 according to this embodiment. The liquid crystal display device 10, as shown in FIG. 3, includes rectangular pixels 46r, 46g, and 46b (hereinafter, referred to as a pixel 46 in aggregate) that are disposed in a matrix shape. The pixels perform display of red, green, and blue colors. The pixels 46r, 46g, and 46b are repeatedly disposed in the direction of the X-axis shown in the figure in the described order. In addition, the pixels 46 corresponding to a same color are disposed in straight lines, which are in the shapes of stripes, in parallel with each other for the direction of the Y-axis. Between adjacent pixels 46, light shielding films 48 formed of a black resin are formed. Hereinafter, rows of the pixels 46 for the direction of the X-axis are referred to as pixel rows 50.

Each pixel 46 contributes to display of one between the first image and the second image. The pixel 46 that displays the first image is also referred to as the first pixel 46L, and the pixel 46 that displays the second image is also referred to as the second pixel 46R. In this example, the pixels 46L and 46R are repeated disposed in an alternating manner for the direction of the pixel rows 50, that is, the direction of the X-axis and are disposed in straight lines in the shape of stripes that are in parallel with each other for the direction of the Y-axis.

Figure 4:
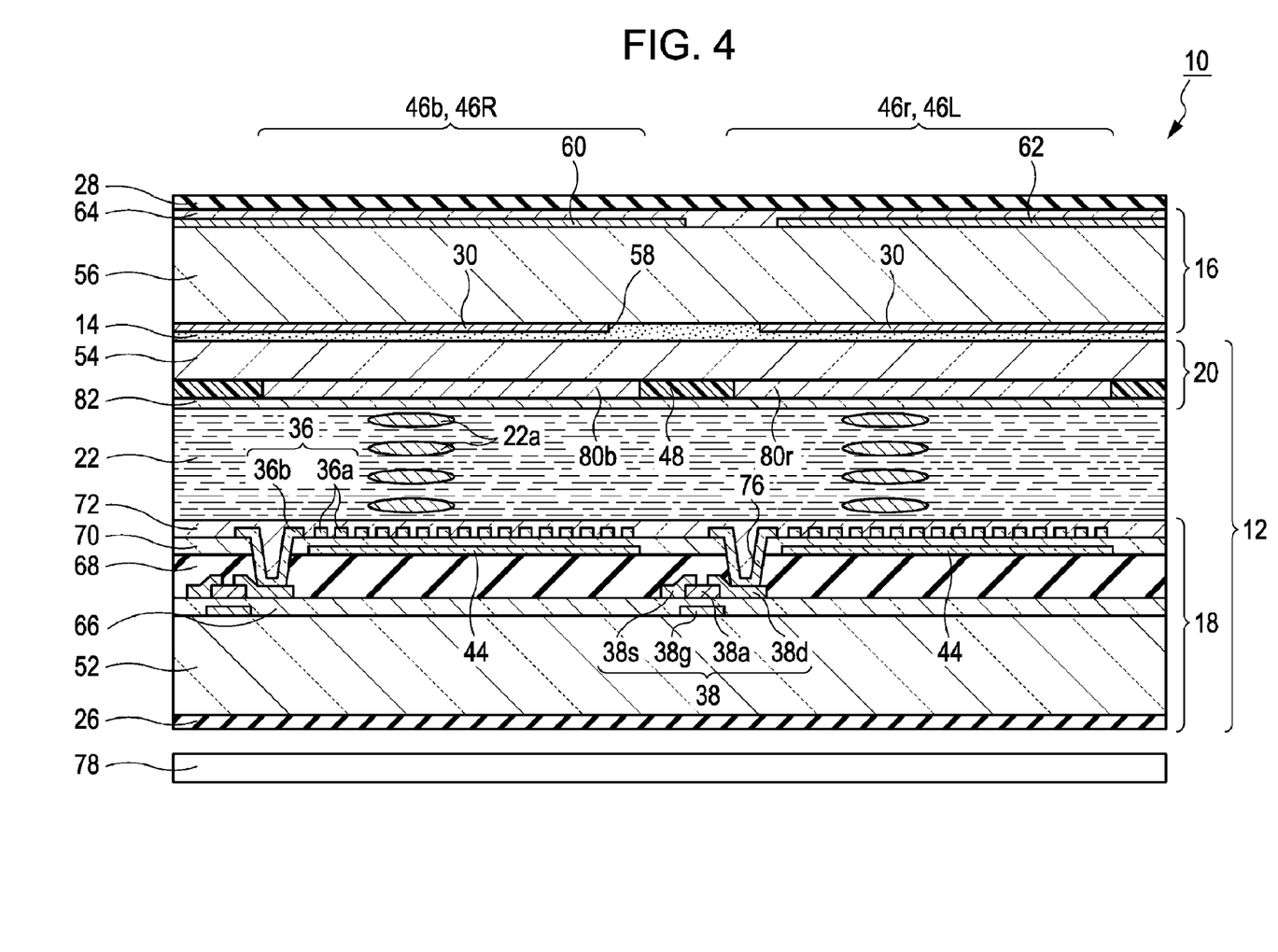
FIG. 4 is a schematic cross-section view of the liquid crystal display shown in FIG. 3.

FIG. 4 is a schematic cross-section view of the liquid crystal display 10 shown in FIG. 3. The liquid crystal panel 12, as shown in FIG. 4, includes the component substrate 18 and the opposing substrate 20 that face each other with the sealing member 24 (see FIG. 1) having a frame shape interposed therebetween. In the component substrate 18, a substrate main body 52 as a first substrate is included. In addition, In the opposing substrate 20, a substrate main body 54 as a third substrate is included. The substrate main bodies 52 and 54 have transparency. Between the component substrate 18 and the opposing substrate 20, the liquid crystal layer 22 is enclosed.

The touch panel 16 has a substrate main body 56 that is a second substrate as a second substrate. The substrate main body 56 is formed so as to oppose a face of the substrate main body 54 which is located on the outer side (a side apart from the liquid crystal layer 22). The substrate main body 56 has transparency. On the inner side (the liquid crystal layer 22 side) of the substrate main body 56, a barrier layer 30 is formed. The barrier layer 30 that is disposed on the inner side of the substrate main body 56 has an opening part 58 and has a light shielding property. The substrate main bodies 56 and 54 are fixed with the barrier layer 30 interposed therebetween. The barrier layer 30 formed in the substrate main body 56 has the opening part 58 in an area partially overlapped with the light shielding film 48 between the pixels 46L and 46R, viewed from the direction of the normal line of the liquid crystal panel 12. Here, "between the pixels 46L and 46R" represents a position in which the pixels 46L and 46R are adjacent in the described order along the direction (that is, a negative direction of the X-axis) from the right side to the left side of the figure and excludes a position in which the pixels 46R and 46L are adjacent in the described order along the above-described direction. Accordingly, the opening parts 58 are disposed in positions corresponding to every other light shielding films 48 disposed in the X-axis. In addition, the width of the opening part 58 is formed to be slightly larger than that of the light shielding film 48. When the width of the opening part 58 is formed to be larger than that of the light shielding film 48, as shown in FIG. 4, the amount of light output from the opening part 58 increases. Accordingly, in such a case, there is an advantage that luminance of the whole liquid crystal panel 12 is improved. To the contrary to FIG. 4, when the width of the opening part 58 is equal to or smaller than that of the light shielding film 48, generation of crosstalk between the pixels 46R and 46L can decrease.

The barrier layer 30 is a metal film that has a light shielding property. For example, the material of the barrier layer 30 is chrome. In addition, the barrier layer 30 may be formed of a resin. In such a case, in order to reduce noise from the liquid crystal panel 12, a transparent conductive film (a conductive film having transparency) is formed. In other words, when the barrier layer 30 is formed of a metal film such as chrome that has conductivity, the transparent conductive film may not be attached thereto. In addition, the place in which the barrier layer 30 is formed may be on the touch panel 16 side or the liquid crystal panel 12 side as long as the place is located between the touch panel 16 and the liquid crystal panel 12.

The touch panel 16 includes detection electrodes 60 and 62 that are formed on the outer side (a side apart from the liquid crystal layer 22) of the substrate main body 56 and a coating film 64 that coats the detection electrodes 60 and 62. The detection electrodes 60 and 62 have transparency.

Next, a detailed configuration of the liquid crystal display device 10 will be described with reference to FIGS. 3 and 4. On the inner side (the liquid crystal layer 22 side) of the substrate main body 52 included in the component substrate 18, constituent elements of a first layer to a fourth layer are laminated. The component substrate 18 includes the substrate main body 52 that is formed of a transparent material such as glass, crystal, or plastic, a component forming layer 66, an interlayer insulation film 68, an electrode insulating film 70, and an alignment film 72 that are sequentially formed on the inner side of the substrate main body 52. The component forming layer 66 has a configuration in which an insulation film, a semiconductor film, and a semiconductor film are laminated. The component forming layer 66 constitutes wiring parts such as the data lines 40 or the scanning lines 42, and the TFT elements 38 shown in FIG. 2.

The component substrate 18 is so-called a TFT component substrate that includes the TFT element 38 formed for each pixel 46, the scanning line 42, the data line 40, the pixel electrode 36, and the like that are connected to the TFT element 38. In addition, in order to prevent short-circuit between constituent elements of the layers, the component forming layer 66 is formed between the first and second layers, the interlayer insulation film 68 is formed between the second and third layers, and the electrode insulating film 70 is formed between the third and fourth layers. As the switching element, instead of the TFT element 38 having three terminals, a TFD (Thin Film Diode) element having two terminals or the like may be used.

The interlayer insulation film 68 is formed of a transparent material such as acryl and is disposed so as to cover the component forming layer 66.

The electrode insulating film 70 is formed of a transparent material such as SiN and is disposed so as to cover the common electrodes 44 formed on the interlayer insulation film 68.

The alignment film 72 is formed of a resin material such as polyimide and is disposed so as to cover the pixel electrodes 36 that are formed on the electrode insulating film 70. For the surface of the alignment film 72, an alignment process for regulating the initial alignment state of liquid crystal molecules constituting the liquid crystal layer 22 is performed.

In the first layer that is formed on the surface of the substrate main body 52, gate electrodes 38g of the TFT elements 38 are formed.

On the first layer, the second layer is formed through the component forming layer 66 formed of $SiO_2$, SiN, or the like. In the second layer, a semiconductor layer 38a formed of amorphous silicon is formed in a position overlapped with the gate electrode 38g. In addition, a source electrode 38s is formed in the source region of the semiconductor layer 38a and a drain electrode 38d is formed in the drain region, in a state that the source electrode and the drain electrode are partially overlapped with each other. In addition, the source electrode 38s is connected to the data line 40. The TFT element 38 is configured by the semiconductor layer 38a, the source electrode 38s, the drain electrode 38d, and the gate electrode 38g.

The component substrate 18 includes the common electrodes 44 that are disposed on the inner side (the liquid crystal layer 22 side) of the interlayer insulation film 68 and the pixel electrodes 36 that are disposed on the inner side (the liquid crystal layer 22 side) of the electrode insulating film 70. On the second layer, the third layer is formed through the interlayer insulation film 68 that is formed of $SiO_2$, SiN, or the like. In the third layer, the common electrodes 44 formed of ITO (Indium Tin Oxide) having transparency are formed. The common electrodes 44 are connected to a constant potential line and are maintained at a fixed electric potential.

On the third layer, the fourth layer is formed through the electrode insulating film 70 that is formed of SiN or the like. In the fourth layer, the pixel electrodes 36 that have a portion having a stripe shape are formed so as to be overlapped with the common electrodes 44. The pixel electrode 36 is connected to the drain electrode 38d of the TFT element 38 through a contact hole 76 that is formed by perforating the interlayer insulation film 68 and the electrode insulating film 70.

The pixel electrode 36 includes a plurality of band-shaped parts 36a that are formed in stripe shapes with a gap formed therebetween and a frame part 36b that makes the plurality of band-shaped parts 36a in a conductive state with one another.

The common electrode 44 is formed so as to cover the interlayer insulation film 68 and is formed of a transparent conduction material such as ITO. To the common electrode 44, a predetermined fixed voltage that is, for example, used for driving the liquid crystal layer 22, 0 V, or a signal that is periodically (for each frame period or each field period) switched between a predetermined fixed electric potential and a different predetermined fixed electric potential is applied.

When a driving voltage is applied between the common electrode 44 and the pixel electrode 36, an electric field is generated from the pixel electrode 36 toward the common electrode 44 (or from the common electrode 44 toward the pixel electrode 36). At this moment, an electric field that is substantially parallel to the substrate main body 52, that is, a horizontal electric field is generated in the liquid crystal layer 22. The liquid crystal molecules 22a change the alignment direction thereof within a plane parallel to the substrate main body 52 in accordance with the horizontal electric field. As a result, relative angles with respect to the transmission axes of the polarizing plates 26 and 28 change, and display is performed based on the polarization converting function according to the relative angles. This liquid crystal mode is called an FFS mode. In the FFS mode, the liquid crystal molecules 22a are driven in a state parallel to the substrate main body 52 all the time, and accordingly a wide viewing angle can be acquired. In addition, in the surface layer of the fourth layer, the alignment film 72 that is formed of polyimide is formed.

On the outer side (a side apart from the liquid crystal layer 22) of the substrate main body 52, the polarizing plate 26 is disposed. In addition, a back light 78 that faces the polarizing plate 26 and emits light toward the liquid crystal device 10 is disposed.

On the other hand, the opposing substrate 20 includes the substrate main body 54 that is formed of a transparent material such as glass, crystal, or plastic, the light shielding film 48 that is sequentially laminated on the inner side (the liquid crystal layer 22 side) of the substrate main body 54, a red color filter 80r, a green color filter 80g (not shown), and a blue color filter 80b (hereinafter, referred to as a color filer layer 80 in aggregate) that are disposed in correspondence with the pixels 46r, 46g, and 46b sequentially formed, and an alignment film 82. The color filer layer 80 is a resin that absorbs light, which has a predetermined wavelength, of incident light and can form the transmitted light in a predetermined color (for example, a red, green, or blue color) by using the color filter layer 80. In addition, in an area between adjacent pixels 46, the light shielding film 48 that is formed of a black resin having a light shielding property is formed. On the color filter layer 80 and the surface layer of the light shielding film 48, the alignment film 82 that is formed of polyimide is formed. Alternatively, it may be configured that an over-coat formed of a resin having transparency is laminated on the color filter layer 80 and the light shielding film 48 and the alignment film is formed thereon.

The color filter layer 80 is disposed within an area partitioned by the light shielding film 48 disposed in correspondence with each sub pixel area. The color filter layers 80 are, for example, formed of acryl or the like and contain coloring materials corresponding to colors to be displayed in each sub pixel area.

The substrate main body 54 is processed to have a thickness of about 50 μm by a chemical etching process, a CMP (Chemical Mechanical Polishing) process, or the like. By performing this process, distances between the color filter layers 80 from which display light is substantially projected and the opening parts 58 of the barrier layer 30 are adjusted. As a result, an angle of a light path from the color filter layer 80 to the opening part 58 is adjusted. Accordingly, the first image and the second image can be displayed at appropriate angles by using the liquid crystal display device 10.

The light shielding film 48 is formed to have an approximate lattice shape in a plan view in an area that is an edge part of the sub pixel area of the surface of the substrate main body 56 in a plan view and is overlapped with the TFT element 38, the data line 40, the scanning line 42 through the liquid crystal layer 22 and the like. In addition, the light shielding film 48 is formed in an edge of the sub pixel area (see FIG. 3).

The alignment film 82 is formed of a transparent resin material such as polyimide and is disposed so as to cover the light shielding films 48 and the color filter layers 80. In addition, for the inner side (the liquid crystal layer 22 side) of the alignment film 82, an alignment process is performed.

As described above, the liquid crystal display device 10 has a configuration in which a voltage is applied between the band-shaped part 36a and the common electrode 44 and the liquid crystal is driven by an electric field (horizontal electric field) in the direction of a substrate plane which is generated by application of the voltage. Accordingly, the pixel electrode 36 and the common electrode 44 form an electrode structure of the FFS (Fringe-Field Switching) mode.

In addition, to the outer side of one substrate main body 54, the touch panel 16 is attached through the adhesive agent 14. The touch panel 16 has the substrate main body 56 as the base body thereof, and the above-described barrier layer 30 is formed on the inner side of the substrate main body 56. On the outer side of the substrate main body 56, the detection electrodes 60 and 62 as the conductive films having transparency and the polarizing plate 28 are formed on an approximately entire face in the described order. As materials of the detection electrodes 60 and 62, ITO may be used. The transmission axis of the polarizing plate 28 is configured to be perpendicular to the transmission axis of the polarizing plate 26.

The detection electrodes 60 and 62 are maintained at a fixed electric potential. For example, the fixed electric potential may be any one of a ground electric potential, an electric potential that is the same as that of the common electrode 44, a center electric potential of an image signal supplied to the data line 40, a non-selection electric potential of a scanning signal applied to the scanning line 42, and a logic electric potential of a driving unit that drives the liquid crystal display device 10.

Figure 5:
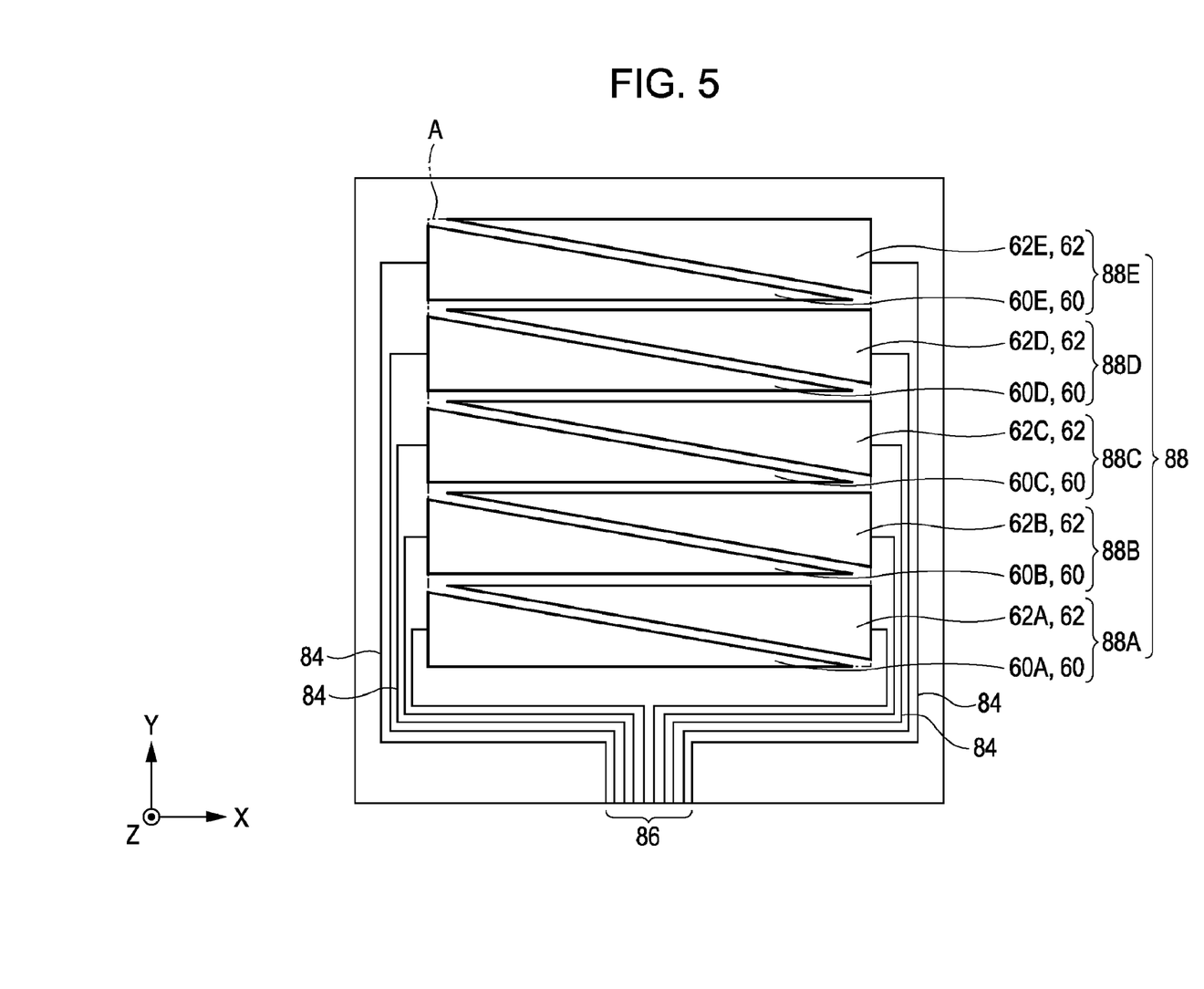
FIG. 5 is a diagram showing detection electrodes according to the embodiment.

FIG. 5 is a diagram showing the detection electrodes 60 and 62 according to this embodiment. The touch panel 16, as shown in FIGS. 4 and 5, includes the detection electrodes 60 and 62 that are formed on the outer side of the substrate main body 56, a lead-out wiring 84, a terminal part 86, and a coating film 64 that coats the detection electrodes 60 and 62, the lead-out wiring 84, and the terminal part 86.

A plurality of the detection electrodes 60 and 62 (in this embodiment, five detection electrodes 60 and five detection electrodes 62), as shown in FIG. 5, is formed in a detection area "A" overlapped with the image display area and is, for example, formed of a transparent conduction material such as ITO. The detection electrodes 60 and 62 are formed along the direction (the first direction) of the X-axis that is the direction of one side of the detection area A having an approximately rectangular shape in a plan view. In addition, the detection electrodes 60 and 62 are alternately disposed in the direction (the second direction) of the Y-axis that is the direction of the other side of the detection area A and is perpendicular to the direction of the X-axis.

The detection electrodes 60 and 62 have an approximately right triangle in a plan view and has a same shape. Two sides of the detection electrode 60 are formed to be parallel to the directions of the X-axis and Y-axis, and the hypotenuse of the detection electrode 60 is formed to be tilted from the directions of the X-axis and Y-axis so as to face one side (+Y side) of the direction of the Y-axis. The width of the detection electrode 60 gradually decreases from one side (−X side) of the direction of the X-axis toward the other side (+X side).

On the other hand, the two sides of the detection electrode 62 are formed to be parallel to the directions of the X-axis and Y-axis, and the hypotenuse of the detection electrode 62 is formed to be tilted from the directions of the X-axis and Y-axis so as to face the other side (−Y side) of the direction of the Y-axis. The width of the detection electrode 62 gradually increases from one side (−X side) of the direction of the X-axis toward the other side (+X side).

Here, the plurality of the detection electrodes 60 is sequentially referred to as the detection electrodes 60A to 60E in the order from closest to the farthest from the −Y side. In addition, the plurality of the detection electrodes 62 is sequentially referred to as the detection electrodes 62A to 62E in the order from closest to the farthest from the −Y side.

In addition, two detection electrodes 60 and 62, which are adjacent to each other so as to have the hypotenuses face each other in the direction of the Y-axis, among the detection electrodes 60 and 62 having an approximately triangle shape form a detection electrode pair 88. Thus, in one detection electrode pair 88, a ratio of the width of one detection electrode 60 to the width of the other detection electrode 62 changes along the direction of the X-axis from the −X side toward the +X side. In other words, the ratio of the width of the detection electrode 60 of the detection electrode pair 88 gradually decrease along the direction of the X-axis from −X side toward +X side, and the ratio of the width of the detection electrode 62 gradually increases.

Since the hypotenuses of the detection electrodes 60 and 62 face each other, the outer shape of the detection electrode pair 88 is an approximately rectangular shape in a plan view. In addition, since five detection electrodes 60 and five detection electrodes 62 are formed, five pairs of the detection electrode pairs 88 are formed.

Here, the five detection electrode pairs 88 are sequentially referred to as the detection electrode pairs 88A to 88E in the order from the closest to the farthest from the −Y side. In other words, a detection electrode pair 88A is formed by the detection electrodes 60A and 62A, a detection electrode pair 88B is formed by the detection electrodes 60B and 62B, a detection electrode pair 88C is formed by the detection electrodes 60C and 62C, a detection electrode pair 88D is formed by the detection electrodes 60D and 62D, and a detection electrode pair 88E is formed by the detection electrodes 60E and 62E.

In addition, as shown in FIG. 5, an X coordinate that is a coordinate in the direction of the X-axis detectable in the detection area A having an approximately rectangular shape in a plan view and a Y coordinate that is a coordinate in the direction of the Y-axis are set to ranges of 0 to 1 and 1 to 5. Here, the value of the X coordinate corresponding to a shorter side of the detection area A on the −X side is 0, and the value of the X coordinate corresponding to a shorter side of the detection area A on the +X side is "1". In addition, the value of the Y coordinate corresponding to a center line that is parallel to the detection electrode pair 88A in the direction of the X-axis is "1", the value of the Y coordinate corresponding to a center line that is parallel to the detection electrode pair 88B in the direction of the X-axis is "2", the value of the Y coordinate corresponding to a center line that is parallel to the detection electrode pair 88C in the direction of the X-axis is "3", the value of the Y coordinate corresponding to a center line that is parallel to the detection electrode pair 88D in the direction of the X-axis is "4", and the value of the Y coordinate corresponding to a center line that is parallel to the detection electrode pair 88E in the direction of the X-axis is "5".

The lead-out wiring 84, as shown in FIG. 5, is formed together with the detection electrodes 60 and 62 along the outer periphery of the opposing substrate 20 on the outer side of the substrate main body 56 and connects the connection electrodes 60 and 62 and the terminal part 86. The lead-out wiring 84 is formed of a conductive material having resistivity lower than that of ITO formed of Al (aluminum) or the like. In addition, the lead-out wiring 84 that is connected to the detection electrode 60 is connected to the detection electrode 60 in an end part of the detection electrode 60 on the −X side. On the other hand, the lead-out wiring 84 that is connected to the detection electrode 62 is connected to the detection electrode 62 in an end part of the detection electrode 62 on the +X side.

The terminal part 86 is formed together with the detection electrodes 60 and 62 and the lead-out wiring 84 in a position that is on the outer side of the substrate main body 56 and on the outside of the detection area A in the −Y side and is connected to the detection unit 32 (see FIG. 1) that is disposed on the outside of the opposing substrate 20. To the detection electrodes 60 and 62, an AC voltage is applied from the detection units 32 through the terminal part 86.

The detection unit 32 is configured to apply an AC voltage to the detection electrodes 60 and 62 through the terminal part 86 and detect the electrostatic capacitance between the detection electrodes 60 and 62 through the polarizing plate 26 and the coating film 64 for detecting a difference between a voltage value detected in a reference state in which a finger or the like is not in a contact state and a voltage value detected in a state that a finger or the like is in a contact state as the amount of change in the electrostatic capacitance.

The calculation unit 34, as shown in FIG. 1, includes an X coordinate calculating section (a first coordinate calculating section) 34A and a Y coordinate calculating section (a second coordinate calculating section) 34B that calculate the coordinates in the directions of the X-axis and Y-axis based on the amount of change in the electrostatic capacitance of the detection electrodes 60 and 62 (see FIG. 4) which is detected by the detection unit 32. A method of calculating the coordinates by using the calculation unit 34 will be described later. A coordinate input device 90 is configured by the touch panel 16, the polarizing plate 28, the detection unit 32, and the calculation unit 34.

Referring back to FIG. 4, the polarizing plate 28 is configured by using a film that is formed by using an insulation material such as PVA (polyvinyl alcohol) as a base body. The polarizing plate 26, as the polarizing plate 28, is configured by using a PVA film as a base body. In addition, on the outer side (a side apart from the liquid crystal layer 22) of the polarizing plate 26, a protection film (not shown) that protects the polarizing plate 26 may be disposed. The polarizing plate 26 is disposed such that the transmission axis thereof is approximately parallel to the polarizing plate 28.

Here, on the inner side (the liquid crystal layer 22 side) of the polarizing plate 26, a quarter wavelength plate may be disposed. By disposing the quarter wavelength plate, it can be prevented that external light incident from the outer side of the polarizing plate 26 is reflected from the component substrate 18 so as to be projected again. The transmission axis of the polarizing plate 26 is appropriately changed in accordance with the quarter wavelength plate.

In addition, on the inner side (the liquid crystal layer 22 side) of one or both of the polarizing plates 26 and 28, an optical compensation film (not shown) may be disposed. By disposing the optical compensation film, a phase difference of the liquid crystal layer 22 for a case where the liquid crystal display device 10 is perspective viewed can be corrected. Accordingly, the optical leak of the liquid crystal device can decrease and the contrast thereof can increase. As the optical compensation film, a film acquired from combining a negative uniaxial medium and a positive uniaxial medium or a biaxial medium in which indexes of refraction for each direction satisfies a condition of nx>nz>ny is used.

Operation of Liquid Crystal Display Device

Next, the liquid crystal display device 10 having the above-described configuration will be described. Light incident from the outer side of the component substrate 18 is converted into straight polarized light by the polarizing plate 26 and is incident to the liquid crystal layer 22.

Here, in an off-state in which a voltage is not applied between the pixel electrode 36 and the common electrode 44, the straight polarized light incident to the liquid crystal layer 22 is projected from the liquid crystal layer 22 in a same polarized state as that at a time when the light is incident from the liquid crystal layer 22. Then, since the straight polarized light has the direction of polarization perpendicular to the transmission axis of the polarizing plate 28, the straight polarized light is blocked by the polarizing plate 28, and thereby the sub pixel area displays black.

On the other hand, in an on-state in which a voltage is applied between the pixel electrode 36 and the common electrode 44, the phase of the straight polarized light incident to the liquid crystal layer 22 changes by a predetermined amount (½ wavelength) of phase difference caused by the liquid crystal layer 22, and the straight polarized light is converted into straight polarized light perpendicular to the polarization direction of the incident polarized light and is projected from the liquid crystal layer 22. Then, since the straight polarized light has the direction of polarization parallel to the transmission axis of the polarizing plate 28, the straight polarized light is transmitted through the polarizing plate 28 to be visually recognized as display light, and thereby the sub pixel area displays bright.

Then, when a person's finger or the like is touched on the polarizing plate 28 in a state that an AC voltage is applied to the detection electrodes 60 and 62, electrostatic capacitance between the detection electrodes 60 and 62 and the finger or the like is formed though the polarizing plate 28 and the coating film 64. Accordingly, currents flow from the detection electrodes 60 and 62 through the electrostatic capacitance. Then, the detection unit 32 detects the amounts of change in the currents as the amounts of change in the electrostatic capacitance in accordance with formation of the electrostatic capacitance. Then, the calculation unit 34 calculates a contact position of the finger or the like in the detection area A based on the amounts of change in the electrostatic capacitance detected by the detection unit 32.

Thereafter, based on information on the calculated contact position, an image displayed in the image display area is switched or a trajectory of the finger that moves on the surface of the polarizing plate 28 is displayed as an image in the image display area.

Figure 6:
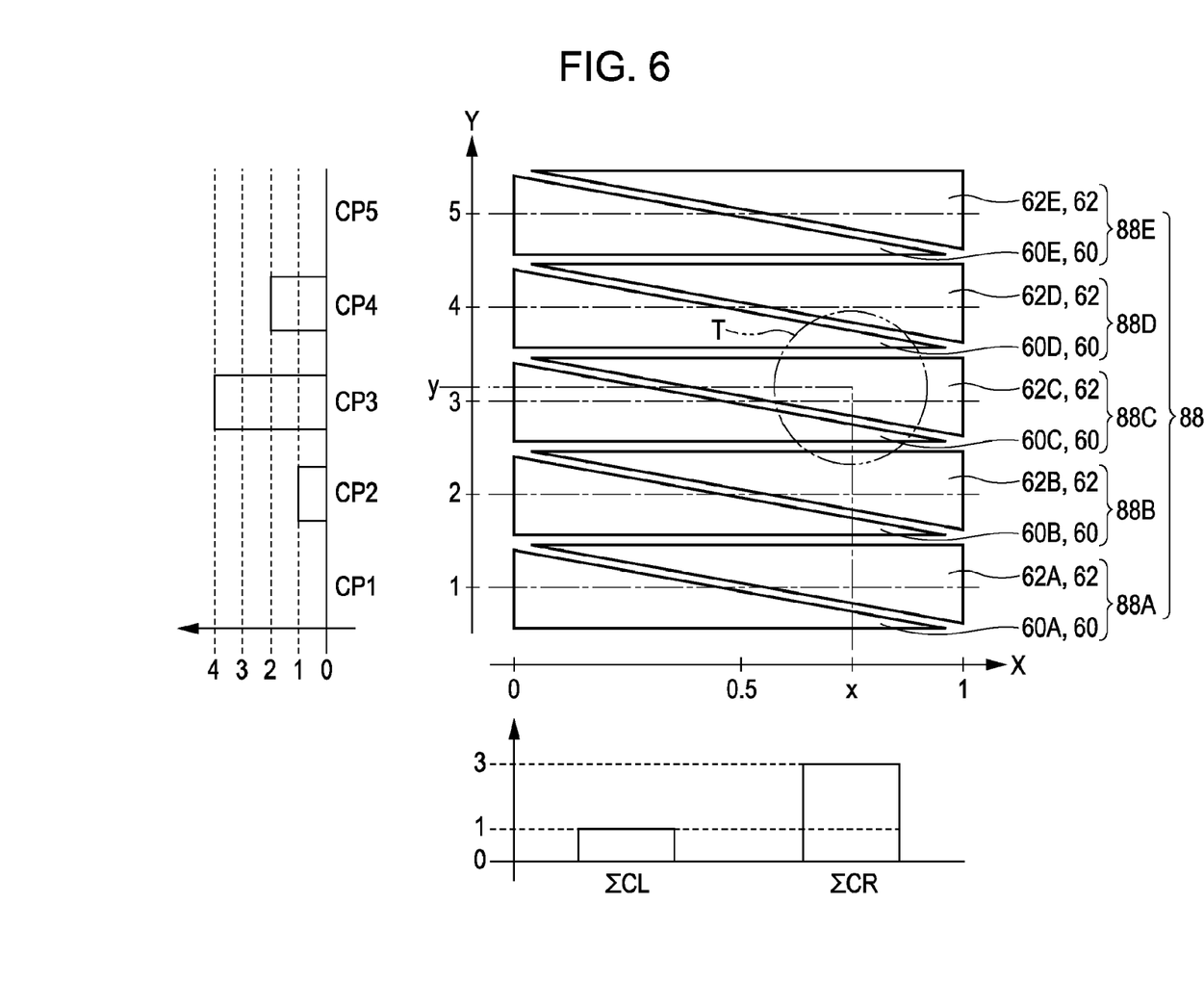
FIG. 6 is a diagram showing a method of calculating coordinates according to the embodiment.
Figure 7:
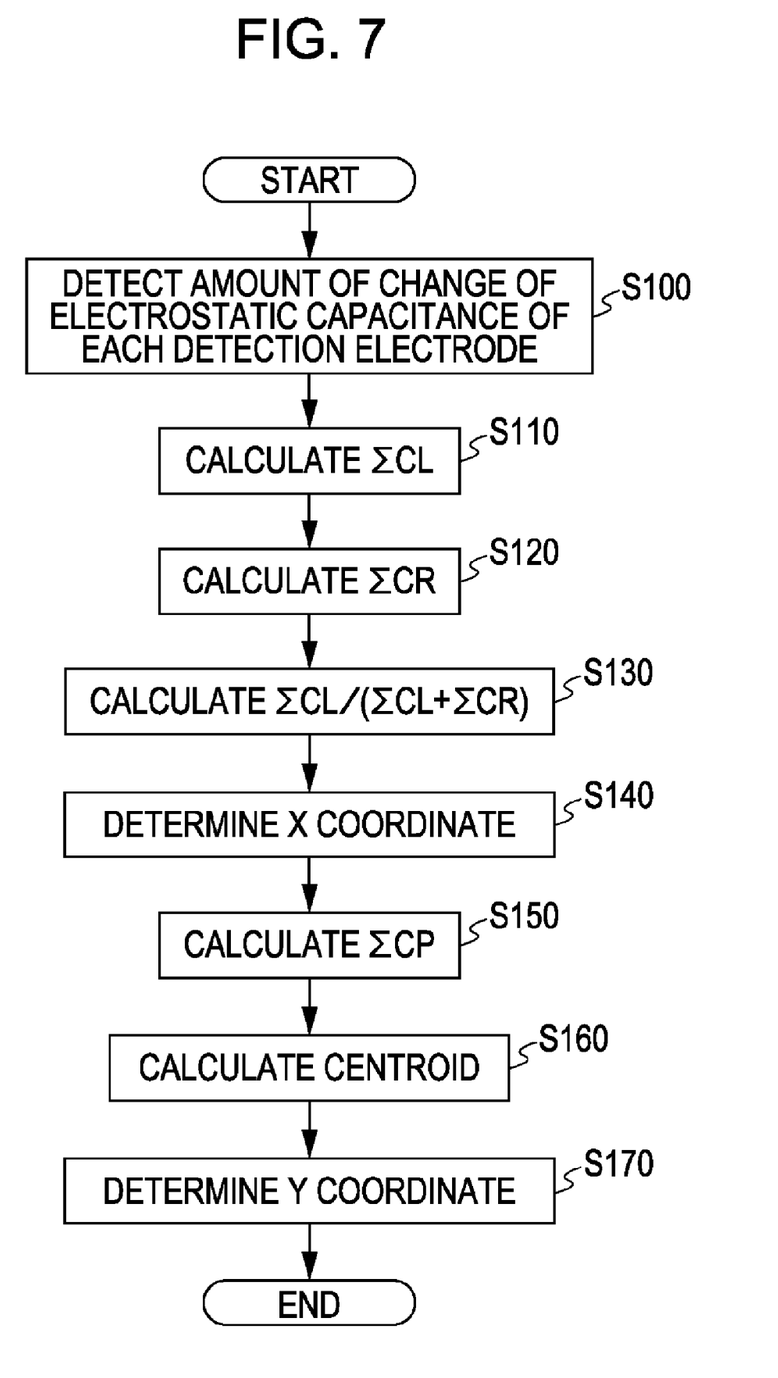
FIG. 7 is a flowchart showing the method of calculating the coordinates according to the embodiment.

Here, a method of calculating the contact position will be described in detail. FIG. 6 is a diagram showing a method of calculating the contact position according to this embodiment, and FIG. 7 is a flowchart showing the method of calculating the contact position according to this embodiment. A symbol T denoted in FIG. 6 represents the contact area of the finger for the polarizing plate 28.

First, the detection unit 32 (see FIG. 1) detects the amounts CL and CR of change in the electrostatic capacitance of the detection electrodes 60 and 62 (Step S100 shown in FIG. 7). Here, the detection unit 32 detects a difference between electrostatic capacitance detected in the detection electrodes 60 and 62 in a reference state of non-contact of the finger or the like and electrostatic capacitance detected in the detection electrodes 60 and 62 in a contact state of the finger or the like.

The X coordinate calculating section 34A (see FIG. 1) calculates ΣCL that is a sum of the amounts CL of change in the electrostatic capacitance which are detected in the detection electrodes 60 (Step S110) and calculates ΣCR that is a sum of the amounts CR of change in the electrostatic capacitance detected in the detection electrodes 62 (Step S120). Then, the X coordinate calculating section 34A calculates a ratio of ΣCL to ΣCR (Step S130) and calculates an X coordinate (Step S140).

For example, as shown in FIG. 6, when the ratio of ΣCL to ΣCR is 1:3, the ratio of ΣCL to (ΣCL+ΣCR) is 1:4. Accordingly, the X coordinate calculating section 34A calculates the X coordinate as 0.75.

On the other hand, the Y coordinate calculating section 34B (see FIG. 1) calculates the amounts CP of change in the electrostatic capacitance in the detection electrodes pairs 88A to 88E (Step S150). Then, the Y coordinate calculating section performs a centroid calculating process in which the center position of changes in the electrostatic capacitance occurring in the detection electrode pairs 88A to 88E is calculated (Step S160). Here, the Y coordinate is calculated by using the following Equation (1) (Step S170).

$$y = \Sigma(n \times CP)/\Sigma CP \qquad \text{Equation (1)}$$

Here, n×CP represents multiplying the amount of change in the electrostatic capacitance of the detection electrode pair 88 by a value of the Y coordinate corresponding to the center line of the detection electrode pair 88 in the width direction.

For example, as shown in FIG. 6, the amount CP1 of change in the electrostatic capacitance of the detection electrode pair 88A is assumed to be "0", the amount CP2 of change in the electrostatic capacitance of the detection electrode pair 88B is assumed to be "1", the amount CP3 of change in the electrostatic capacitance of the detection electrode pair 88C is assumed to be "4", the amount CP4 of change in the electrostatic capacitance of the detection electrode pair 88D is assumed to be "2", and the amount CP5 of change in the electrostatic capacitance of the detection electrode pair 88E is assumed to be "0". In such a case, (1×0+2×1+3×4+4×2+5×0)/(0+1+4+2+0)=3.14. Accordingly, the Y coordinate calculating section 34B calculates the value of the Y coordinate as 3.14. As described above, the contact position of the finger is calculated from the values of the X coordinate and the Y coordinate.

Figure 8:
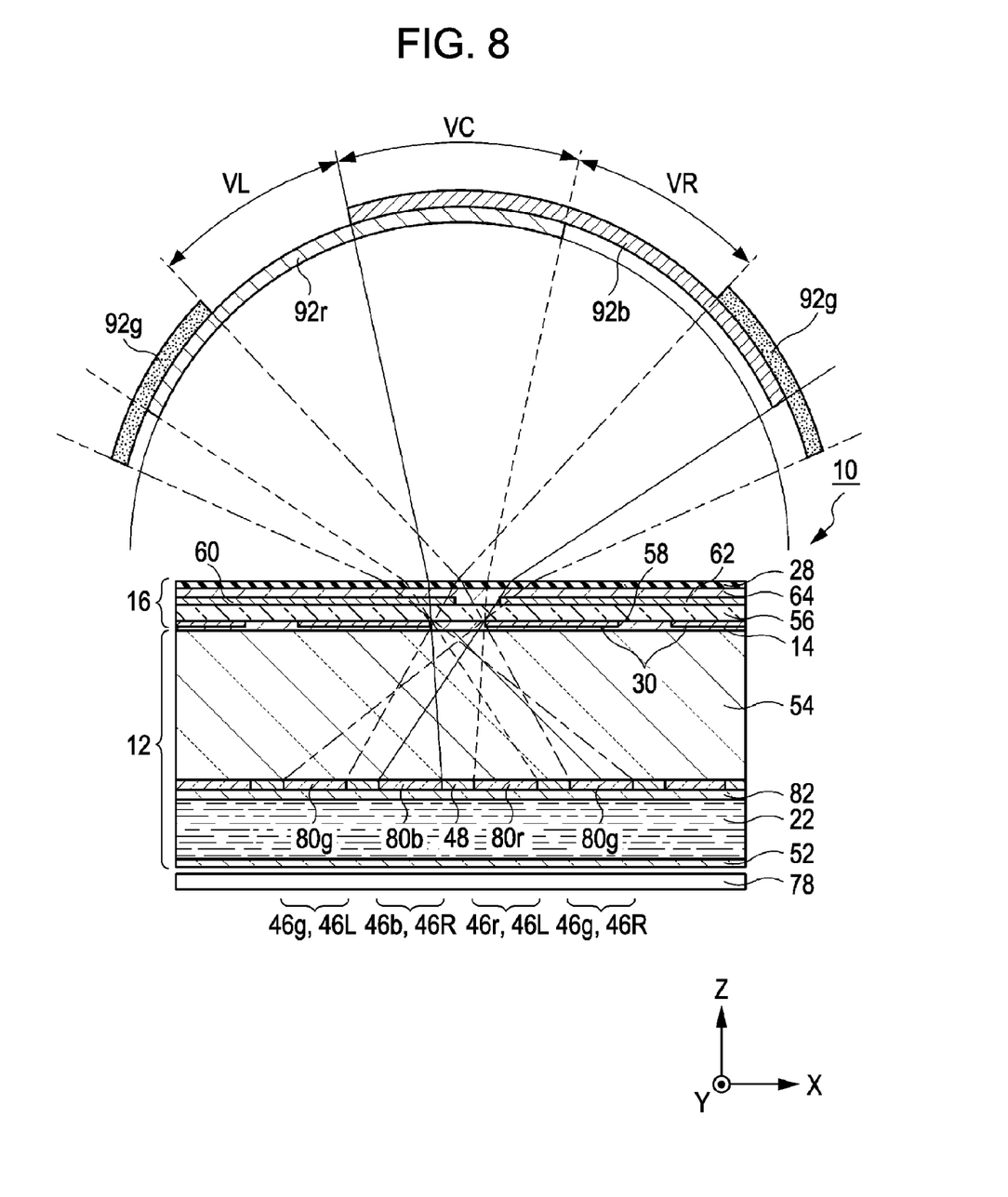
FIG. 8 is a diagram showing the structure of the liquid crystal display device shown in FIG. 3 together with relationship between a viewing angle and display visually recognized at the viewing angle.

FIG. 8 is a diagram showing the cross-sectional structure of the liquid crystal display device 10 shown in FIG. 3 together with relationship between a viewing angle and display visually recognized at the viewing angle. The figure is drawn with light passing through the opening part 58 disposed between a pixel 46b (pixel 46R) and a pixel 46r (pixel 46L) primarily focused. The movement of light passing through another opening part 58 is the same as that shown in the figure. In the figure, for the convenience of description for a light path, the substrate main body 54 is drawn relatively thicker than its real size, and the constituent elements of the component substrate 18 are omitted.

The display light from the pixel 46r is refracted at a time when the display light passes through the opening part 58 and is incident to the air layer and is visually recognized in an angle range denoted by reference sign 92r. Similarly, the display light from the pixel 46g and 46b are visually recognized in the ranges denoted by reference signs 92g and 92b. The angle ranges 92r and 92b, the angle ranges 92r and 92g, the angle ranges 92b and 92g are partially overlapped with each other.

As a result, in the angle range VL that is distributed to the left side from the front, display light from the pixel 46b is shielded by the barrier layer 30 not to be visually recognized, and only display light from the pixel 46r is visually recognized. On the other hand, in the angle range VR that is distributed to the right side from the front, the display light from the pixel 46r is shielded by the barrier layer 30 not to be visually recognized, and only the display light from the pixel 46b is visually recognized. In other words, in the angle range VL, only the first image from the pixel 46L is visually recognized. In addition, in the angle range VR, only the second image from the pixel 46R is visually recognized. As a result, the liquid display device 10 can display two different images for the angle ranges VL and VR. Each of the angle ranges VL and VR is about 30°.

As described above, the liquid crystal display device 10 is so-called a two-screen display device and can be observed from tilted left and right sides, and accordingly, the liquid crystal display device is needed to have a wide viewing angle. Thus, as described above, the liquid crystal display device 10 employs the fringe-field switching (FFS) mode.

In addition, in the angle range VC that is interposed between the angle ranges VL and VR on the front side, the display light from the pixels 46b and 46r are visually recognized together. In other words, the angle range VC is configured as a mixed area in which the first image and the second image are displayed together. The reason is that the width of the opening part 58 in the direction of the X-axis is larger than that of the light shielding film 48 in the direction of the X-axis.

In the above-described liquid crystal display device 10, the barrier layer is formed in the second substrate and the second and third substrates are fixed with the barrier layer interposed therebetween, and accordingly, the thickness of the device is small. Accordingly, one substrate is omitted, and the device becomes thinner by the thickness of the substrate, and thereby miniaturization and lightness of the device can be implemented. In addition, a decrease in costs can be achieved. By forming the detection electrodes 60 and 62 in the touch panel 16, the following aspects are included. Although an electrode for driving the liquid crystal layer 22 is not formed in the opposing substrate 20, static electricity that is generated in the touch panel 16 and the opposing substrate 20 can be removed through the detection electrodes 60 and 62. Furthermore, accumulation of static electricity in the substrates can be prevented in advance. Accordingly, display that has fewer problems due to the static electricity for various displays and has high quality can be performed.

Method of Manufacturing Liquid Crystal Display Device

Figure 9:
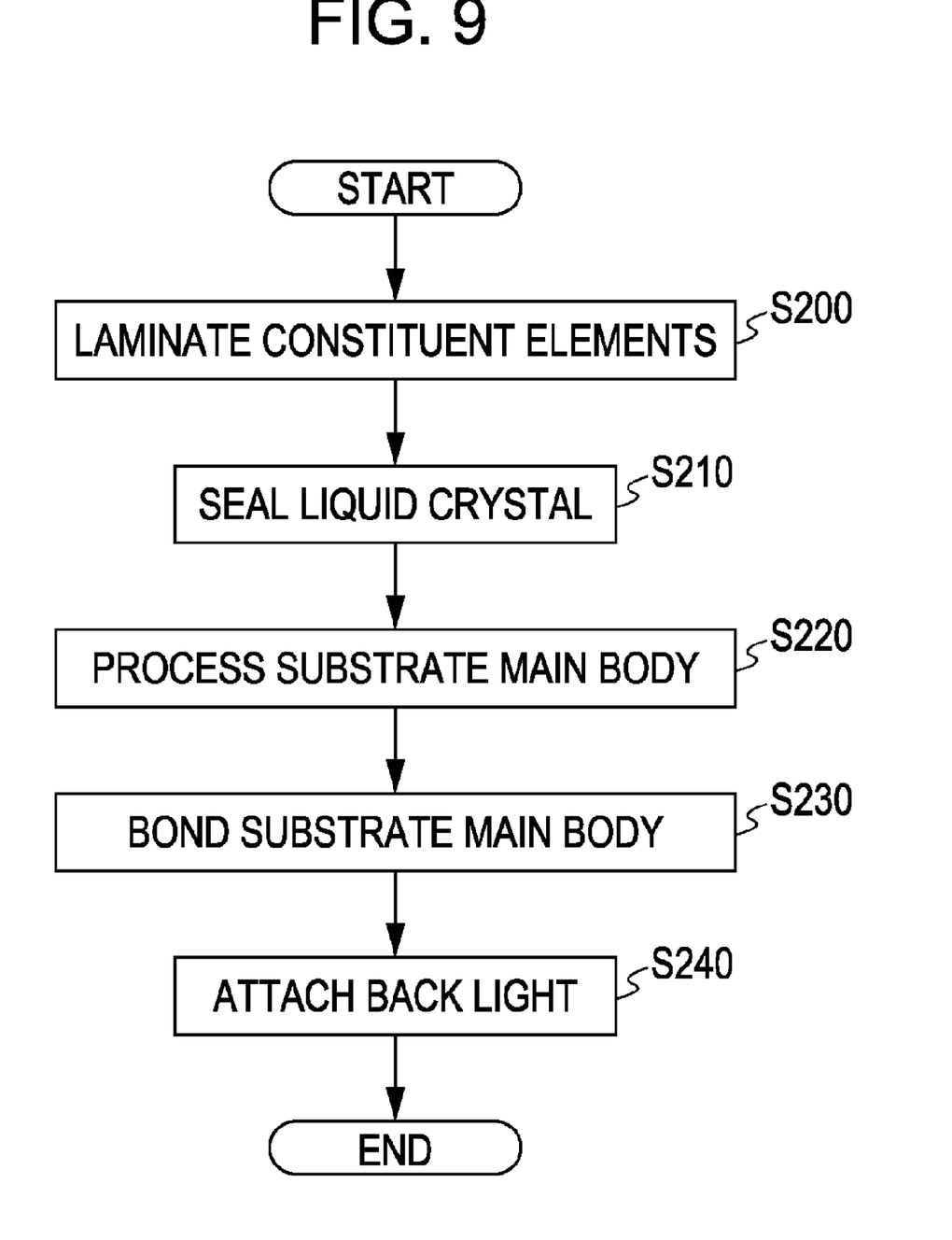
FIG. 9 is a flowchart showing a method of manufacturing a liquid crystal display device according to an embodiment of the invention.

The above-described liquid crystal display device 10 is manufactured by using processes as shown in FIG. 9.

FIG. 9 is a flowchart showing a method of manufacturing the liquid crystal display device according to this embodiment. First, the above-described constituent elements are laminated on the inner side (the liquid crystal layer 22 side) of the substrate main bodies 54 and 52 (Step S200). In particular, the common electrode 44 and the pixel electrode 36 are formed on the substrate main body 52.

Next, both the substrate main bodies are bonded together through the sealing member, and then, the liquid crystal layer 22 is sealed between the substrate main bodies (Step S210). In particular, the substrate main body 54 having transparency is formed such that the common electrode 44 and the pixel electrode 36 face each other with a gap interposed therebetweeen. Then, between the substrate main bodies 52 and 54, the liquid crystal layer 22 is formed.

Subsequently, the substrate main body 54 is processed to have a thickness of about 50 μm by performing a chemical etching process, a CMP process, or the like (Step S220).

Next, the substrate main body 56 (the touch panel 16) in which the barrier layer 30 and the detection electrodes 60 and 62 are formed in advance is bonded to the substrate main body 54 (the opposing substrate 20) through the adhesive agent 14 (Step S230). In particular, the detection electrodes 60 and 62 that have transparency and are used for detecting contact depending on a change in the electrostatic capacitance are formed on the first face of the substrate main body 56. Then, on the second face that is opposite to the first face of the substrate main body 56, the barrier layer 30 that has a light shielding property and has the opening part 58 disposed in correspondence with a position between the first and second pixels 46L and 46R that are adjacent to each other is formed. Thereafter, the second face of the substrate main body 56 and the outer side of the substrate main body 54 are fixed to face each other with the barrier layer 30 interposed therebetween. Finally, the polarizing plates 26 and 28 are disposed and the back light 78 is attached thereto for completing manufacture of the liquid crystal display device (Step S240).

According to this manufacturing method, the detection electrodes 60 and 62 are not needed to be directly formed in the substrate main body 54 that is processed to be thin, and accordingly, the substrate main body 54 is not easily damaged. In addition, by attaching the touch panel 16 having the detection electrodes 60 and 62 to the opposing substrate 20, the static electricity generated in the opposing substrate 20 and the touch panel 16 can be removed. Furthermore, accumulation of static electricity in these substrates can be prevented in advance.

Example of Mounting Liquid Crystal Display Device on Electronic Apparatus

Figure 10:
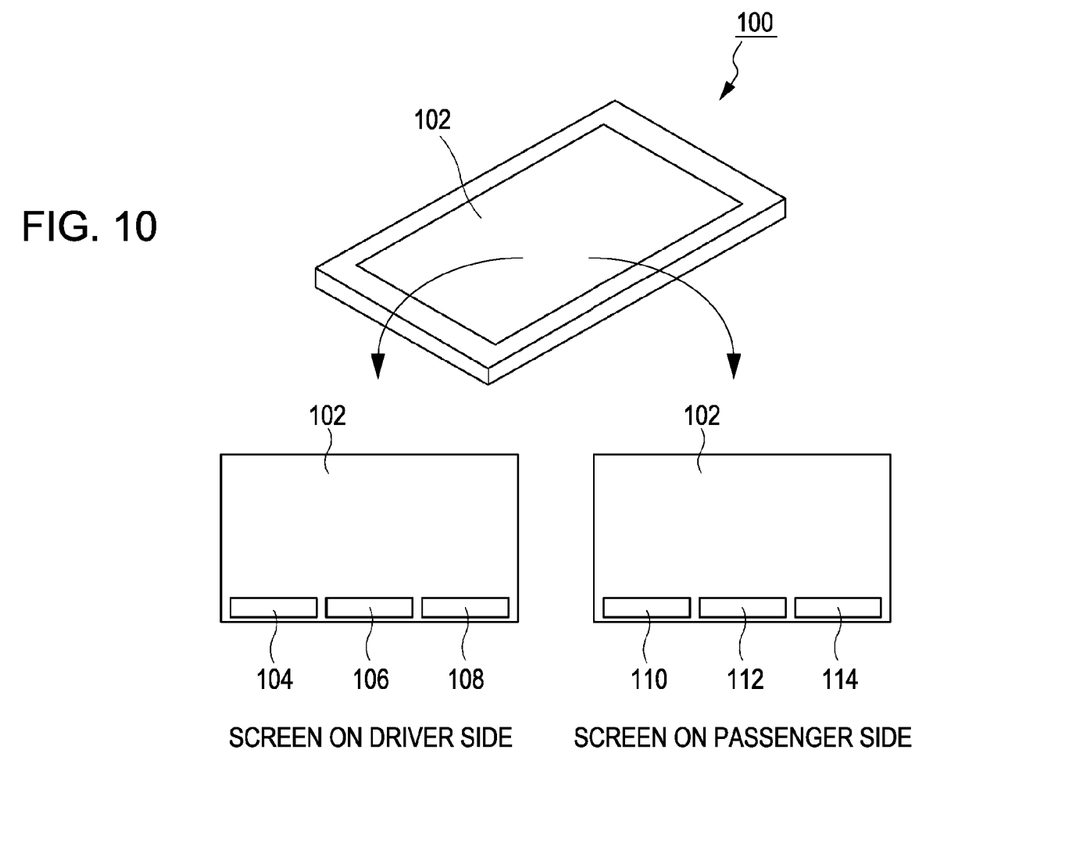
FIG. 10 is a perspective view showing an example of an electronic apparatus according to an embodiment of the invention.

FIG. 10 is a perspective view showing an example of an electronic apparatus according to an embodiment of the invention. The above-described liquid crystal display device 10, for example, can be mounted on a liquid crystal display device 100 of a vehicle navigation system as an electronic apparatus as shown in FIG. 10. The display crystal display device 100 can simultaneously display two images in different directions by using the liquid crystal display device 10 mounted on a display unit 102. For example, while an image of a map is displayed on a side of the driver's seat, an image of a movie can be displayed on a side of the passenger's seat.

On the image of the map displayed on the side of the driver's seat, menu buttons 104, 106, and 108 are displayed. To these menu buttons, various programs can be assigned. For example, an electronic mail is assigned to the menu button 104, a browser is assigned to the menu button 106, and drawing software is assigned to the menu button 108. In such a case, by only touching the menu button, required software can be driven.

In addition, on the image of the move displayed on the side of the passenger's seat, menu buttons 110, 112, and 114 are displayed. To these menu buttons, various programs can be assigned. For example, a menu is assigned to the menu button 110, zoom is assigned to the menu button 112, and input switching is assigned to the menu button 114. In such a case, by only touching the menu button, a required operation can be performed.

In addition, the liquid crystal display device 10 may be used in various electronic apparatuses such as mobile computers, digital cameras, digital video cameras, vehicle built-in apparatuses, or audio apparatuses in addition to the above-described liquid crystal display devices 100.

Although the embodiments of the invention have been described as above, for example, the following can be considered as modified examples.

The invention is not limited to a liquid crystal display device of a flat panel type and may be applied to a display device of a Braun-tube type. In addition, as the flat panel type, the invention is not limited to the liquid crystal display panel and may be employed to a plasma display panel or an organic EL (Electro Luminescence) display. In addition, the invention is not limited to the vehicle navigation system and may be applied to an apparatus on which a display device capable of performing dual view display is mounted. Thus, the invention may be applied not only to a familiar device such as a cellular phone, a PDA, a personal computer, or a television receiver but also to a measurement instrument, a medical instrument, an industrial instrument, or the like. In addition, the invention is not limited to two-dimensional (2D) display and may be applied to three-dimensional (3D) display for displaying a three-dimensional image by enabling a viewer A or B to view different images in the both eyes.

The entire disclosure of Japanese Patent Application No. 2008-010098, filed Jan. 21, 2008 is expressly incorporated by reference herein.

What is claimed is:

1. An electro-optical device that displays a multiple viewing point image comprising:
    an electro-optical panel that has a plurality of pixels and includes at least a first substrate having transparency;
    a touch panel that detects contact in accordance with a change in electrostatic capacitance and includes a second substrate having transparency;
    a barrier layer that is formed on a face of the second substrate which is located on the first substrate side, has an opening part disposed in correspondence with an area between the adjacent pixels, and has a light shielding property; and
    a detection electrode that is formed on a face of the second substrate which is located on a side apart from the first substrate, has transparency, is used for detecting contact depending on a change in electrostatic capacitance,
    wherein the second substrate and the first substrate are fixed with the barrier layer interposed therebetween.

2. The electro-optical device according to claim 1, wherein the barrier layer is a metal film.

3. The electro-optical device according to claim 1,
    wherein the electro-optical panel includes a light shielding film having a light shielding property disposed between the adjacent pixels, and wherein the width of the opening part of the barrier layer is larger than that of the light shielding film.

4. The electro-optical device according to claim 1,
wherein the electro-optical panel includes a light shielding film having a light shielding property disposed between the adjacent pixels, and
wherein the width of the opening part of the barrier layer is equal to or smaller than that of the light shielding film.

5. The electro-optical device according to claim 1, wherein the electro-optical panel includes:
a third substrate that is formed to face the first substrate with a gap interposed therebetween and has transparency;
an electro-optical material that is formed between the first substrate and the third substrate; and
a common electrode and a pixel electrode that apply a driving voltage to the electro-optical material formed on an electro-optical material side of the third substrate.

6. An electronic apparatus having the electro optical device according to claim 1.

7. A method of manufacturing an electro-optical device that displays a multiple viewing point image, the method comprising:
forming an electro-optical panel that has a plurality of pixels and includes at least a first substrate having transparency;
forming a touch panel that detects contact in accordance with a change in electrostatic capacitance and includes a second substrate having transparency;
forming a barrier layer that is formed on a face of the second substrate which is located on the first substrate side, has an opening part disposed in correspondence with an area between the adjacent pixels, and has a light shielding property; and
forming a detection electrode that is formed on a face of the second substrate which is located on a side apart from the first substrate, has transparency, is used for detecting contact depending on a change in electrostatic capacitance,
wherein the second substrate and the first substrate are fixed with the barrier layer interposed therebetween.

* * * * *